Figure 1:
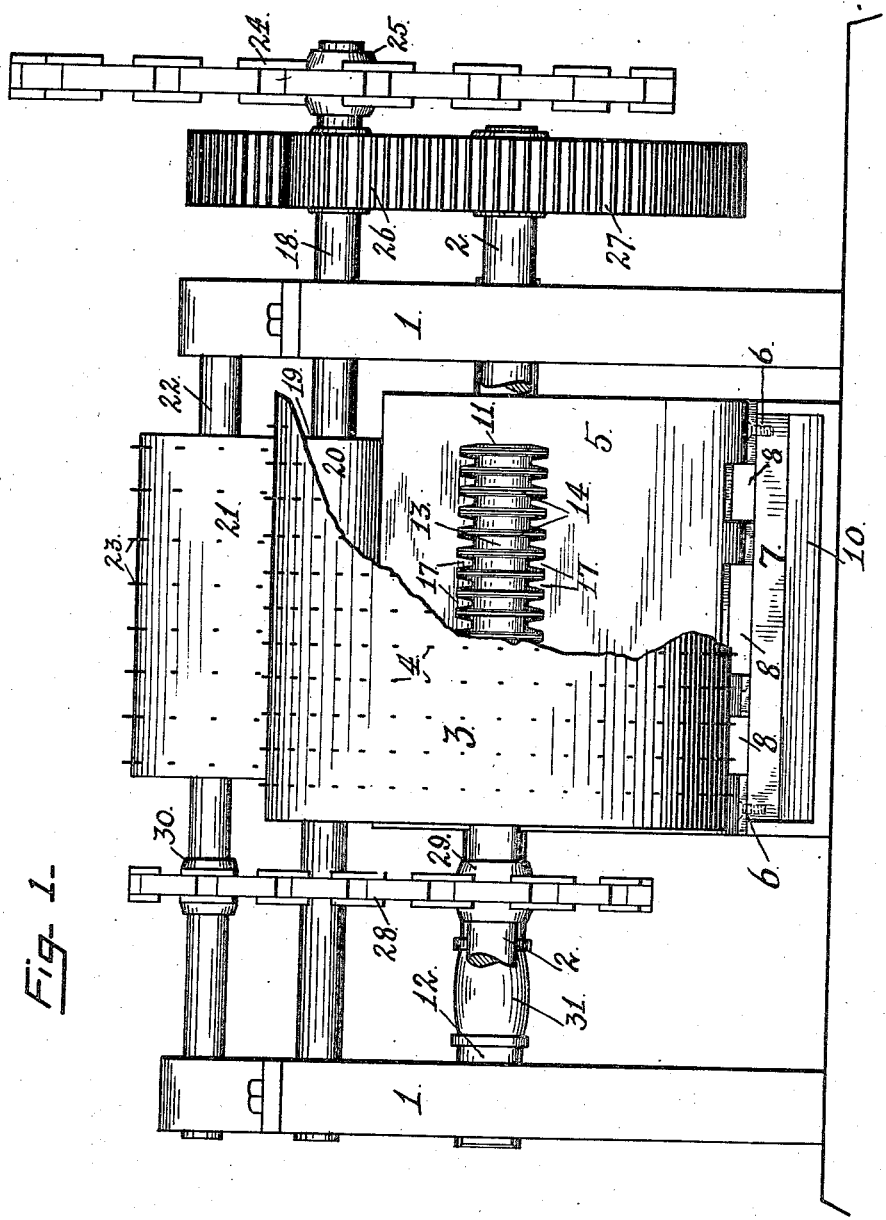

J. A. OLSEN.
MACHINE FOR REMOVING THE PULP FROM PREVIOUSLY SEPARATED PINEAPPLE PEEL.
APPLICATION FILED FEB. 23, 1915.

1,138,143. Patented May 4, 1915.

3 SHEETS—SHEET 1.

WITNESSES:
Wm. F. Drew.
S. Constine.

INVENTOR.
John Alfred Olsen
BY Wm. F. Booth
ATTORNEY.

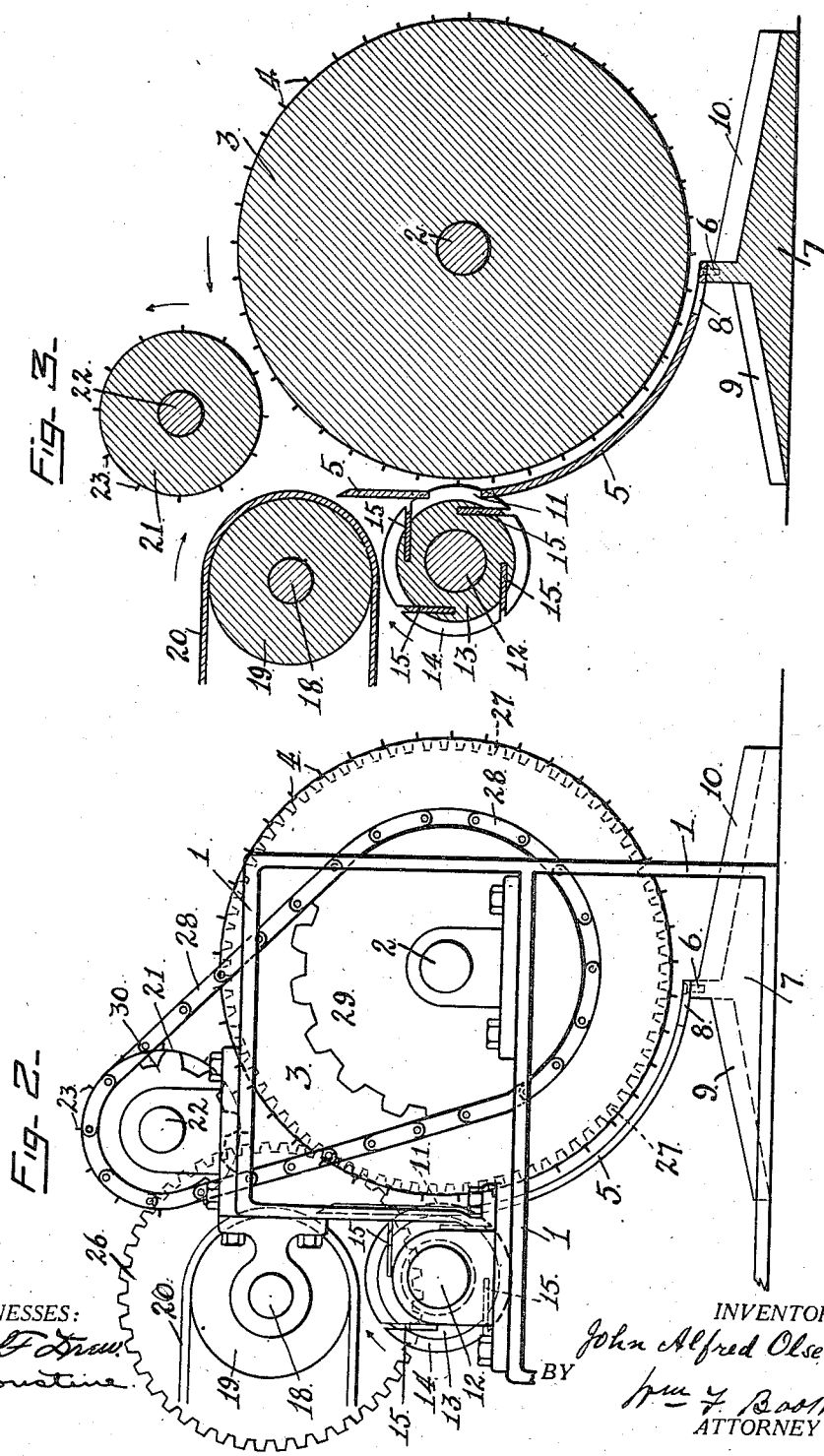

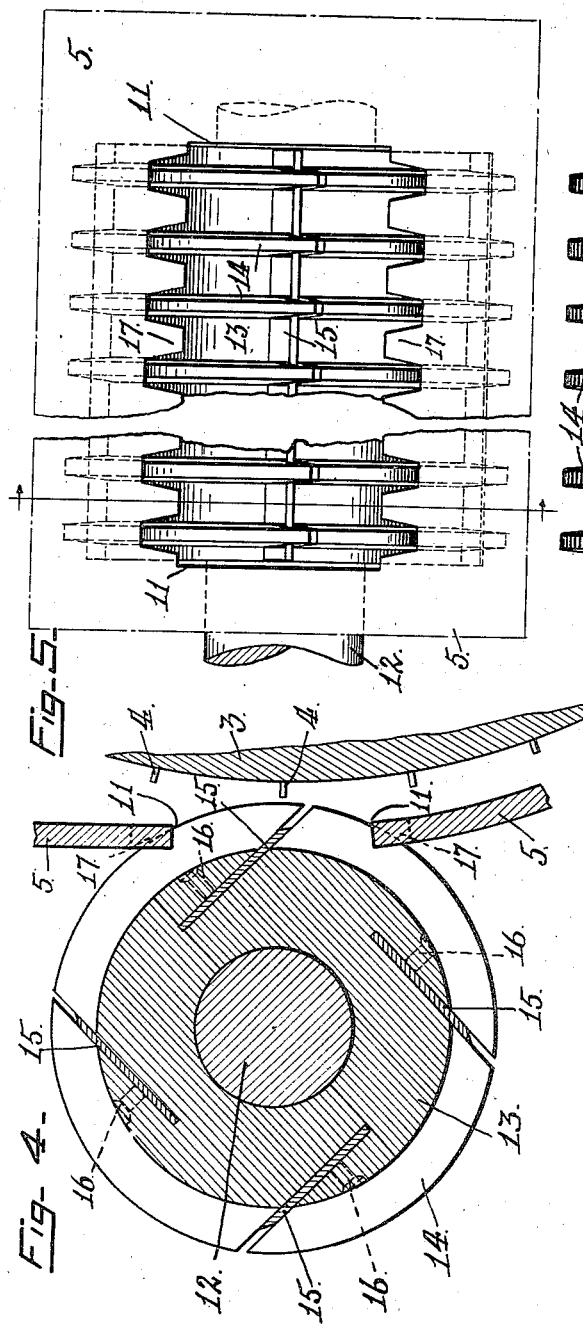

UNITED STATES PATENT OFFICE.

JOHN ALFRED OLSEN, OF HONOLULU, TERRITORY OF HAWAII, ASSIGNOR TO CALIFORNIA FRUIT CANNERS ASSOCIATION, OF SAN FRANCISCO, CALIFORNIA, A CORPORATION OF CALIFORNIA.

MACHINE FOR REMOVING THE PULP FROM PREVIOUSLY-SEPARATED PINEAPPLE-PEEL.

1,138,143.  Specification of Letters Patent.  Patented May 4, 1915.

Application filed February 23, 1915. Serial No. 9,775.

*To all whom it may concern:*

Be it known that I, JOHN ALFRED OLSEN, a citizen of the United States, residing at Honolulu, in the Island of Oahu and Territory of Hawaii, have invented certain new and useful Improvements in Machines for Removing the Pulp from Previously-Separated Pineapple-Peel, of which the following is a specification.

This invention relates to that class of fruit-paring or trimming machines which are especially adapted for removing the edible pulp which still clings to the flesh-side of the previously separated or cut off peel of pineapples. Owing to the manner in which, as generally practised, the pineapple is divested of its peel, the latter being split into segments for greater facility in removing the cored out mass of edible pulp, there remains clinging to said segments an appreciable and valuable portion of the pulp, which it is an object to save, as it may be used in one form or another for food.

The object of this invention is to provide a simple and effective machine for paring or trimming off from the previously separated peel-segments, the remaining edible pulp; and to this end the invention consists in the novel machine which will hereinafter be fully described.

Referring to the accompanying drawings—Figure 1 is a rear elevation of the machine, the main-carrier-drum being broken away to show the fixed face-plate, the rotary cutter and grill appearing through the opening in said face-plate. Fig. 2 is an end elevation of the machine. Fig. 3 is a vertical section of the same. Fig. 4 is a cross-section on the line x—x of Fig. 5, showing the rotary cutter and grill, the face plate and the main carrier-drum. Fig. 5 is an elevation, broken, of the face-plate from its inner side, showing the rotary cutter and grill through its opening. Fig. 6 is an elevation, broken, of the rotary grill, the cutter blades being omitted. Fig. 7 is a plan of one of the cutter blades.

1 is the frame of the machine. Mounted in the frame is the shaft 2 which carries the main-carrier-drum 3, having the holding pins 4. Over and separated from the face of the carrier-drum 3 is the fixed face-plate 5. This plate begins in a line above the horizontal diameter of the drum, and in this portion said plate is parallel with a plane tangent to the drum, so that, as clearly shown in Fig. 3, a sufficiently capacious flaring entrance-opening or space is formed between the plate and drum to admit the peel sections. The face plate then continues in a curve parallel with the curvature of the drum, to its lower end, where, below the bottom of the drum, it is firmly fixed at 6 to the base 7. At its fixed lower end the face plate is provided with apertures 8, which communicate with a chute 9 in one side of the base 7, a second chute 10 being in the other side of the base. In the faceplate is made the opening 11 in which the peel-segments are presented to the action of the rotating cutter and grill.

12 is the shaft of the cutter and grill. Upon this shaft is the cutter head 13, the periphery of which is formed or provided with a plurality of spaced circumferential flanges 14 which form the grill. Traversing the grill flanges and the spaces between them are the cutter blades 15. These are seated in grooves in the cutter head 13 and are adjustably held therein by set-screws 16, as seen in Fig. 4. The cutting edges of the blades 15, lie within or back of the peripheral edges of the grill-flanges, the distance being defined by the depth of cut desired, and this being regulatable by the adjustment of the blades, which adjustment also compensates for wear of the blade and its resharpening. The relation of the cutter and grill to the fixed face-plate 5 is such that the grill flanges enter partially through the opening 11 of the face-plate, as seen in Figs. 3 and 4; and, in order to make a better joint both above and below where the flanges enter and leave said opening, the upper and lower edges of the opening are toothed as shown at 17, thereby preventing the pulp from tending to squeeze through at said edges, and better guiding and holding the peel at the proper place for the action of the grill and cutters upon it.

Mounted in the frame 1 is the shaft 18 of the roll 19 of the feed belt 20. This roll lies in such position that the belt 20 may deliver the peel-segments, to the space between the upper part of the face-plate 5 and the main-carrier-drum 3. In order to better guide the segments as they pass around the head of the feed belt and to positively insure their delivery from said belt, there is an initial carrier-drum 21 on a shaft 22 and having pins 23, said drum being located in the space above and between the feed belt and the main-carrier-drum.

The direction of rotation of the several members of the machine is indicated by the arrows in Fig. 3.

The power-transmission may be of any suitable character. For illustration the power is here shown as coming in by the chain 24 to a sprocket 25 on the shaft 18 of the feed-belt-roll 19. A gear 26 on said shaft 18 meshes with a gear 27 on the shaft 2 of the main-carrier-drum 3. A chain 28 from a sprocket 29 on said shaft 2 transmits the power to a sprocket 30 on the shaft 22 of the initial-carrier-drum 21.

The rotary cutter and grill is driven by separate power direct to a pulley 31 on its shaft 12, so that its speed may be properly regulated to perform its function.

The operation of the machine is as follows:—The peel-segments are laid upon the belt 20 with the flesh side down. As a segment reaches the delivery end of the belt where it turns down over its terminal roll 19, it may drop off, or if not, the pins 23 of the initial carrier-drum 21 engage the scaly upper side of the segment, and in addition to guiding it downwardly, tend to pull it away from the belt to which it may cling with a more or less sticky tenacity. The segment is then either dropped from the pins of the carrier 21 or transferred to the pins 4 of the main-carrier 3, which now carry it down behind the face plate 5. Against this plate, the main carrier squeezes the segment with pressure sufficient to force its pulp, when it reaches the opening 11 in said plate, against the grill flanges 14, which latter playing through the opening as they revolve, embed themselves in the fleshy pulp, and the cutter blades 15 accurately trim or shave off said pulp to a depth determined by the position of the blades relatively to the grill flanges. The larger part of the shaved off pulp is carried by the rotating cutter and grill outward from the face plate and drops down to a suitable receiver below. The shaved peel segment is carried on down behind the face plate 5 by the main carrier 3 until it is discharged at the bottom into the chute 10, while such of the pulp, in more or less liquid form as may have also passed down inside the face plate, passes out through the apertures 8 in the bottom of said plate, into the chute 9 and joins the previously separated pulp directly dropped from the cutter and grill.

What is claimed is:—

1. In a machine of the described class, the combination of a rotatable head provided with a peripheral grill composed of spaced, circumferential flanges, said head carrying blades traversing the grill spaces and having their cutting edges lying back of the periphery of the grill-flanges; and means for presenting the material to the action of the blades by pressing it into the grill.

2. In a machine of the described class, the combination of a rotatable head provided with a peripheral grill composed of spaced, circumferential flanges, said head carrying blades traversing the grill spaces and having their cutting edges lying back of the periphery of the grill-flanges; means for adjustably mounting said blades in the head; and means for presenting the material to the action of the blades by pressing it into the grill.

3. In a machine of the described class, the combination of a rotatable head provided with a peripheral grill composed of spaced, circumferential flanges, said head carrying blades traversing the grill spaces and having their cutting edges lying back of the periphery of the grill-flanges; and a traveling carrier adapted to present the material to the action of the blades by pressing it into the grill.

4. In a machine of the described class, the combination of a rotatable head provided with a peripheral grill composed of spaced, circumferential flanges, said head carrying blades traversing the grill spaces and having their cutting edges lying back of the periphery of the grill-flanges; and a rotatable carrier-drum provided with pins adapted to engage the material and present it to the action of the blades while the drum presses it into the grill.

5. In a machine of the described class, the combination of a rotatable head provided with a peripheral grill composed of spaced, circumferential flanges, said head carrying blades traversing the grill spaces and having their cutting edges lying back of the periphery of the grill-flanges; a fixed face plate opposing the grill periphery, said plate having an opening through which the grill-flanges play; and means for presenting the material in said opening to the action of the blades by pressing it into the grill.

6. In a machine of the described class, the combination of a rotatable head provided with a peripheral grill composed of spaced, circumferential flanges, said head carrying blades traversing the grill spaces and having their cutting edges lying back of the periphery of the grill-flanges; a fixed face plate opposing the grill periphery, said plate having an opening through which the grill-flanges play; and a traveling carrier adapted to present the material, while passing the opening in the face plate, to the action of the blades by pressing it into the grill.

7. In a machine of the described class, the combination of a rotatable head provided with a peripheral grill composed of spaced, circumferential flanges, said head carrying blades traversing the grill spaces and having their cutting edges lying back of the periphery of the grill-flanges; a fixed face plate opposing the grill periphery, said plate having an opening through which the grill-flanges play; and a rotatable carrier-drum provided with pins engaging the material, said drum being adapted to present said material, while passing the opening in the face plate, to the action of the blades by pressing it into the grill.

8. In a machine of the described class, the combination of a rotatable head provided with a peripheral grill composed of spaced, circumferential flanges, said head carrying blades traversing the grill spaces and having their cutting edges lying back of the periphery of the grill-flanges; a fixed face-plate opposing the grill-periphery, said plate having an opening through which the grill-flanges play; a rotatable main-carrier drum operating behind the face-plate and adapted to advance the material thereagainst and present it, while passing the opening in said face-plate, to the action of the blades by pressing it into the grill; a feed belt to lead the material in; and an initial carrier-drum to transfer the material from the feed-belt to the main-carrier-drum.

In testimony whereof I have signed my name to this specification in the presence of two subscribing witnesses.

JOHN ALFRED OLSEN.

Witnesses:
GEORGE LAYTON FRASER,
HENRY BUTLER RYAN.